(12) United States Patent
Yi et al.

(10) Patent No.: US 8,200,477 B2
(45) Date of Patent: Jun. 12, 2012

(54) METHOD AND SYSTEM FOR EXTRACTING OPINIONS FROM TEXT DOCUMENTS

(75) Inventors: Jeonghee Yi, San Jose, CA (US);
Tetsuya Nasukawa, Yamato (JP);
Razvan Constantin Bunescu, Athens, OH (US)

(73) Assignee: International Business Machines Corporation, Armonk, NY (US)

( * ) Notice: Subject to any disclaimer, the term of this patent is extended or adjusted under 35 U.S.C. 154(b) by 1684 days.

(21) Appl. No.: 10/692,025

(22) Filed: Oct. 22, 2003

(65) Prior Publication Data

US 2005/0091038 A1    Apr. 28, 2005

(51) Int. Cl.
*G06F 17/27*    (2006.01)

(52) U.S. Cl. ............... 704/9; 704/1; 704/209; 704/260; 704/4; 706/45; 707/100; 707/3; 707/5; 709/203; 709/224; 715/202; 715/256; 715/531; 715/532

(58) Field of Classification Search ........... 704/1, 256.5, 704/9, 209, 260, 4; 706/45; 707/100, 5, 707/3; 709/224, 203; 715/531, 202, 256, 715/532
See application file for complete search history.

(56) References Cited

U.S. PATENT DOCUMENTS

| | | | | |
|---|---|---|---|---|
| 5,371,673 A | * | 12/1994 | Fan | .................................. 704/1 |
| 5,642,522 A | * | 6/1997 | Zaenen et al. | ................. 715/246 |
| 5,721,938 A | * | 2/1998 | Stuckey | ............................ 704/4 |
| 5,761,666 A | * | 6/1998 | Sakai et al. | ............................ 1/1 |
| 5,797,123 A | * | 8/1998 | Chou et al. | ................. 704/256.5 |
| 5,870,700 A | * | 2/1999 | Parra | ................................. 704/9 |
| 5,978,820 A | * | 11/1999 | Mase et al. | ..................... 715/210 |
| 6,076,088 A | * | 6/2000 | Paik et al. | ............................. 1/1 |
| 6,138,087 A | * | 10/2000 | Budzinski | ........................ 704/9 |
| 6,151,571 A | * | 11/2000 | Pertrushin | ..................... 704/209 |
| 6,185,592 B1 | * | 2/2001 | Boguraev et al. | ............. 715/256 |
| 6,199,034 B1 | * | 3/2001 | Wical | ................................ 704/9 |
| 6,332,143 B1 | * | 12/2001 | Chase | ................................... 1/1 |
| 6,487,545 B1 | * | 11/2002 | Wical | .............................. 706/45 |
| 6,865,533 B2 | * | 3/2005 | Addison et al. | ............... 704/260 |
| 6,968,332 B1 | * | 11/2005 | Milic-Frayling et al. | ..... 707/723 |
| 7,024,362 B2 | * | 4/2006 | Chu et al. | ..................... 704/260 |

(Continued)

FOREIGN PATENT DOCUMENTS

FR    2821951    9/2002

(Continued)

OTHER PUBLICATIONS

Cross-Document Summarization by Concept Classification, Hilda Hardy et. al. HARDYH@CS.ALBANY.EDU.

*Primary Examiner* — Michael Colucci

(57) ABSTRACT

A method and system for extracting opinions about a subject of interest from a text document in which each sentence is analyzed individually to identify the opinions. The most relevant feature terms related to the subject are extracted from the document based on their relevancy scores. Candidate feature terms are definite noun phrases at the beginning of the sentences. For each sentence that refers to the subject or a feature term, the invention determines whether the sentence includes an opinion polarity about the subject or the feature term. The opinion polarity is detected by identifying opinion terms in the sentence using an opinion dictionary or an opinion rule base, parsing the sentence with an English parser to identify grammatical components in the sentence and their relationships, and finding a matching entry in the dictionary or the rule base.

6 Claims, 3 Drawing Sheets

U.S. PATENT DOCUMENTS

| | | | |
|---|---|---|---|
| 7,028,250 B2 * | 4/2006 | Ukrainczyk et al. | 715/202 |
| 7,130,879 B1 * | 10/2006 | Dayon | 709/203 |
| 2001/0047290 A1 | 11/2001 | Petras et al. | |
| 2002/0062368 A1 * | 5/2002 | Holtzman et al. | 709/224 |
| 2002/0181785 A1 | 12/2002 | Gutta et al. | |

FOREIGN PATENT DOCUMENTS

| | | |
|---|---|---|
| JP | 2083770 A | 3/1990 |
| JP | 11175638 A | 7/1999 |
| JP | 2002342234 A | 11/2002 |
| JP | 2002358091 | 12/2002 |

* cited by examiner

METHOD AND SYSTEM FOR EXTRACTING OPINIONS FROM TEXT DOCUMENTS

TECHNICAL FIELD

The invention relates to text analytics in computer systems, and more particularly to a method and system for extracting opinions concerning a subject of interest from text documents using an opinion rule database and a dictionary.

BACKGROUND OF THE INVENTION

Today, a huge amount of information is available in online documents such as web pages, newsgroup postings, and on-line news databases. Among the myriad types of information available, one useful type is the sentiment, or opinions, that people express towards a subject. A subject is either a topic of interest or a feature of the topic. For example, knowing the reputation of a company or its competitors' products or brands is valuable for product development, marketing and consumer relationship management. Traditionally, companies conduct consumer surveys for this purpose. Though well-designed surveys can provide quality estimations, they can be costly especially if a large volume of survey data is gathered. A technique to detect favorable and unfavorable opinions toward specific subjects, such as organizations and their products, within large numbers of documents offers enormous opportunities for various applications. It would provide powerful functionality for competitive analysis, marketing analysis, and detection of unfavorable rumors for risk management.

Thus there is a natural desire to detect and analyze favorability within online documents such as Web pages, chat rooms, and news articles, instead of making special surveys with questionnaires. Humans can easily recognize natural opinions among such online documents. In addition, it might be crucial to monitor such online documents, since they sometimes influence public opinion, and negative rumors circulating in online documents may cause critical problems for some organizations. However, analysis of favorable and unfavorable opinions is a task requiring high intelligence and deep understanding of the textual context, drawing on common sense and domain knowledge as well as linguistic knowledge. The interpretation of opinions can be debatable even for humans. For example, when we tried to determine if each specific document was on balance favorable or unfavorable toward a subject after reading an entire group of such documents, we often found it difficult to reach a consensus, even for very small groups of evaluators.

There has been extensive research on automatic text analysis for sentiment, such as the sentiment classifier described by B. Pang et al. in the paper "Thumbs Up? Sentiment Classification Using Machine Learning Techniques," Proc. of the 2002 ACL EMNLP Conference, pages 79-86, 2002. Similarly, P. Subasic at al. discuss affect analysis in "Affect Analysis of Text Using Fuzzy Semantic Typing," IEEE Trans. on Fuzzy Systems, Special Issue, August 2001. In the paper "Mining Product Reputations On The Web," Proc. of the $8^{th}$ ACM SIGKDD Conference, 2002, S. Morinaga et al. describe another method for extracting opinions. These methods only try to extract the overall opinion revealed in a document, either positive or negative, or somewhere in between.

Two challenging aspects of sentiment analysis are: frst, although the overall sentiment about a topic is useful, it is only a part of the information of interest. Document level sentiment classification fails to detect sentiment about individual aspects of the topic. In reality, for example, though one could be generally happy about his car, he might be dissatisfied by the engine noise. To the manufacturers, these individual weaknesses and strengths are equally important to know, or even more valuable than the overall satisfaction level of customers. Second, the association of the extracted sentiment to a specific topic is difficult. Most statistical opinion extraction algorithms perform poorly in this respect. An example of statistical opinion extraction is the ReviewSeer method described by K Dave et al. in "Mining The Peanut Gallery: Opinion Extraction and Semantic Classification of Product Reviews," Proc. of the 12th International WWW Conference, 2003. These algorithms either assume that the topic of the document is known a priori or simply associate the opinion to a topic term co-existing in the same context. The first approach requires a reliable topic or genre classifier that is a difficult problem in itself. A document (or even a portion of a document as small as a sentence) may discuss multiple topics and contain different opinions about different topics. For example, consider the following sentences from which ReviewSeer found positive opinions about the NR70 PDA produced by Sony:

1. As with every Sony PDA before it, the NR70 series is equipped with Sony's own Memory Stick expansion.
2. Unlike the more recent T series CLIEs, the NR70 does not require an add-on adapter for MP3 playback, which is certainly a welcome change.
3. The Memory Stick support in the NR70 series is well implemented and functional, although there is still a lack of nonmemory Memory Sticks for consumer consumption.

The ReviewSeer statistical method, and most other statistical opinion extraction methods, would assign the same polarity to the Sony PDA and the T series CLI Es as that of NR70 for the first two sentences. That is incorrect for the T series CLIEs, although correct for the Sony PDA. The third sentence reveals a negative aspect of the NR70 (i.e., the lack of non-memory Memory Sticks) as well as a positive opinion in the primary phrase. These are expected shortcomings of the purely statistical approaches.

In addition, the prior art methods for extracting opinions typically analyze co-occurrences of expressions within a short distance or patterns to determine the relationships among expressions. Analysis of relationships based on distance has limitations. For example, even when a subject term and an opinion term are contained in the same sentence and located very close to each other, the subject term and the opinion term may not be related at all, as in the example "Although XXX is terrible, YYY is in fact excellent", where "YYY" is not "terrible" at all. A major reason for the lack of focus on relationships between the opinion expressions and subjects may be due to the applications of these techniques. Many of these applications aim to classify the whole document as positive or negative toward a subject of the document that is specified either explicitly or implicitly. Furthermore, the subject of all of the opinion expressions are assumed to be the same as the document subject.

Therefore, there remains a need for a method of extracting opinions from text documents that take into consideration the opinions expressed in individual phrases and sentences rather than just the overall favorability or unfavorability opinions of the documents.

SUMMARY OF THE INVENTION

It is an object of the present invention to provide a method and system for extracting opinions related to a subject of interest from a text document in which the opinions from individual sentences are taken into account rather than just the overall opinion of the document.

It is another object of the invention to provide a method and system for extracting the opinions related to the most relevant features of the subject in addition to those related to the subject itself.

It is yet another object of the invention to provide a method and system for extracting the opinions by identifying an opinion polarity for each opinion term in a sentence using an opinion dictionary or an opinion rule database.

It is also an object of the invention to provide a method and system for extracting the opinions that use an English parser to identify grammatical components of a sentence to facilitate the detection of opinion terms and their polarities.

To achieve these and other objects, the invention provides a method for extracting opinions about a subject of interest from a text document where the subject is associated with a set of features. The method includes the steps of: (a) extracting from the document feature terms related to the features most relevant to the subject; (b) for each sentence referring to a feature term, determining whether the sentence includes an opinion polarity about the feature term; and (c) for each sentence referring to the subject, determining whether the sentence includes an opinion polarity about the subject. To provide support details for the opinions, an opinion skeleton is preferably generated for each opinion that might be a binary skeleton or a ternary skeleton. A binary opinion skeleton includes the subject or a feature term and an opinion term referring to the subject or the feature term. A ternary opinion skeleton includes the subject or a feature term, an opinion term, and a relationship between the subject or feature term and the opinion term. A feature term might have a "part-of" relationship with the subject, an "aftribute-of" relationship with the subject, or an "attribute-of" relationship with the respective feature. The determination of the relevant feature terms includes the steps of: determining the candidate feature terms associated the subject; calculating a relevance score for each candidate feature term; and identifying the most relevant feature terms from the candidate feature terms based on the relevance scores. The relevance scores might be computed using the likelihood ratio test or a mixture model. A candidate feature term is a definite noun phrase that appears at the beginning of a sentence.

To determine whether a sentence includes an opinion polarity, an opinion dictionary is used to see whether an opinion term of the sentence matches any entry in the dictionary. Each entry in the dictionary has an opinion term, a part-of-speech tag, and an opinion polarity associated with the opinion term. For each sentence that includes the subject or a feature term and an opinion term, the sentence is parsed with an English parser to identify its grammatical components and the relationships between the components. The grammatical components could be verb phrases, subject phrases, object phrases, complements, or prepositional phrases. In addition, each feature term may have a modifier that further describes or qualify the meaning of the feature term. For each sentence having a verb phrase where the verb phrase has no matching entry in the opinion dictionary, the invention assigns the opinion polarity of the modifier of the feature term to the feature term. The opinion polarity of the modifier is also defined in the opinion dictionary.

Alternatively, an opinion polarity in a sentence might be determined using an opinion rule database. Each entry in the rule database includes a predicate, an opinion category, and an opinion target. The predicate is typically a verb. For each sentence that has a verb phrase, the invention finds a matching entry in the rule database. If there is a matching entry, it assigns the opinion polarity corresponding to the verb phrase to the feature term, as defined in the matching entry. A rule in the rule database preferably has a relationship term, a target of the opinion, and a polarity of the opinion. Alternatively, each rule includes a relationship term, a source of the opinion, and a target of the opinion. The target of the opinion is a component of the sentence to which the opinion is to be assigned. The source of the opinion is a component of the sentence of which opinion polarity is to be assigned to the target.

Additional objects and advantages of the present invention will be set forth in the description which follows, and in part will be obvious from the description and the accompanying drawing, or may be learned from the practice of this invention.

DESCRIPTION OF THE PREFERRED EMBODIMENTS

The invention will be described primarily as a computer-implemented method and system for extracting opinions from text documents. However, persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the operations of the invention.

Also, an article of manufacture, such as a pre-recorded disk or other similar computer program product, for use with a data processing system, could include a storage medium and program means recorded thereon for directing the data processing system to facilitate the practice of the method of the invention. Such apparatus and articles of manufacture also fall within the spirit and scope of the invention.

A primary goal of the invention is to identify opinions in individual statements of the document rather than just detecting the overall favorability or unfavorability of the document. The existence of statements expressing sentiments is more reliable compared to the overall opinion of a document. For example, the sentence "product A is good but expensive" may be considered as containing two statements: the first statement, "product A is good", indicates a favorable opinion and the second statement, "product A is expensive", indicates an unfavorable opinion. Thus, instead of analyzing the favorability of the whole context, the invention extracts the opinions from each statement and presents them to the end users so that they can use the results according to their application requirements.

The essential part of opinion analysis is to identify how the opinions are expressed in texts and whether the expressions indicate positive (favorable) or negative (unfavorable) opinions toward the subject. Conceptually, a method for extracting opinions from a document involves identification of:

Opinion expressions,

Polarity and strength of the expressions, and

Their relationship to the subject.

These elements are interrelated. For example, in the sentence, "XXX beats YYY", the expression "beats" denotes a positive opinion toward XXX and a negative opinion toward YYY. The invention analyzes the grammatical structures of the sentences and phrases based on natural language processing (NLP) techniques to identify the opinions included in these structures.

Figure 1:
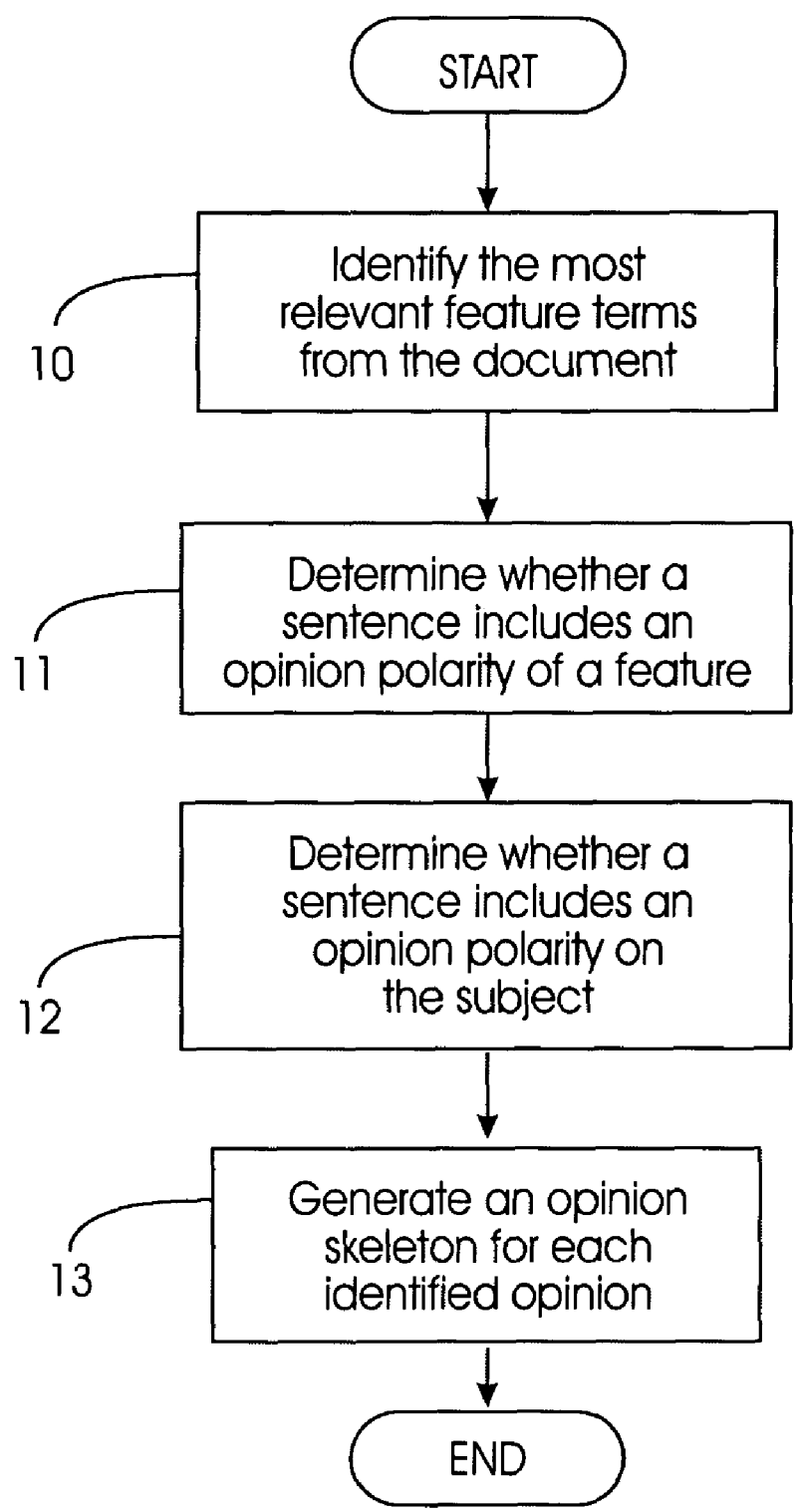
FIG. 1 is a flow chart representing the process for extracting opinions related to a subject of interest from a text document, at a high level, in accordance with the invention.

FIG. 1 is a flow chart representing the process, at a high level, for extracting opinions from a text document in accordance with the invention. At step 10, the terms relating to the features most relevant to the subject are identified from the document. At step 11, for each sentence referring to a feature term, the invention determines whether the sentence includes an opinion polarity about the feature term. At step 12, for each sentence referring to the subject, the invention determines whether the sentence includes an opinion polarity about the subject. In the preferred embodiments of the invention, step 13 is performed although it is not necessary in order to obtain the results of the invention. At step 13, an opinion skeleton might be determined for each extracted opinion to provide supporting details for this opinion. The preferred formats for the opinion skeleton as well as further details on the steps 10-13 are described below in reference to FIGS. 2-3. A feature term of a subject is a term that satisfies either a part-of relationship with the given subject, an attribute-of relationship with the subject, or an attribute-of relationship with a feature of the subject. As an example, consider the paragraph below concerning a review of the digital cameras.

> "This camera has everything that you need. It takes great pictures and is very easy to use. It has very good documentation. Bought 256 MB memory card and can take a huge number of pictures at the highest resolution. Everyone is amazed at the resolution and clarity of the pictures. The results have been excellent from macro shots to telephoto nature shots. Manuals and software are not easy to follow. Good battery fife 200 on 1 GB drive best remote I have seen on any camera. The battery seems to last forever but you will want a spare anyway. The best built in flash I have seen on any camera. The G2 has enough features to keep the consumer and pro creative for some time to come!"

Figure 2:
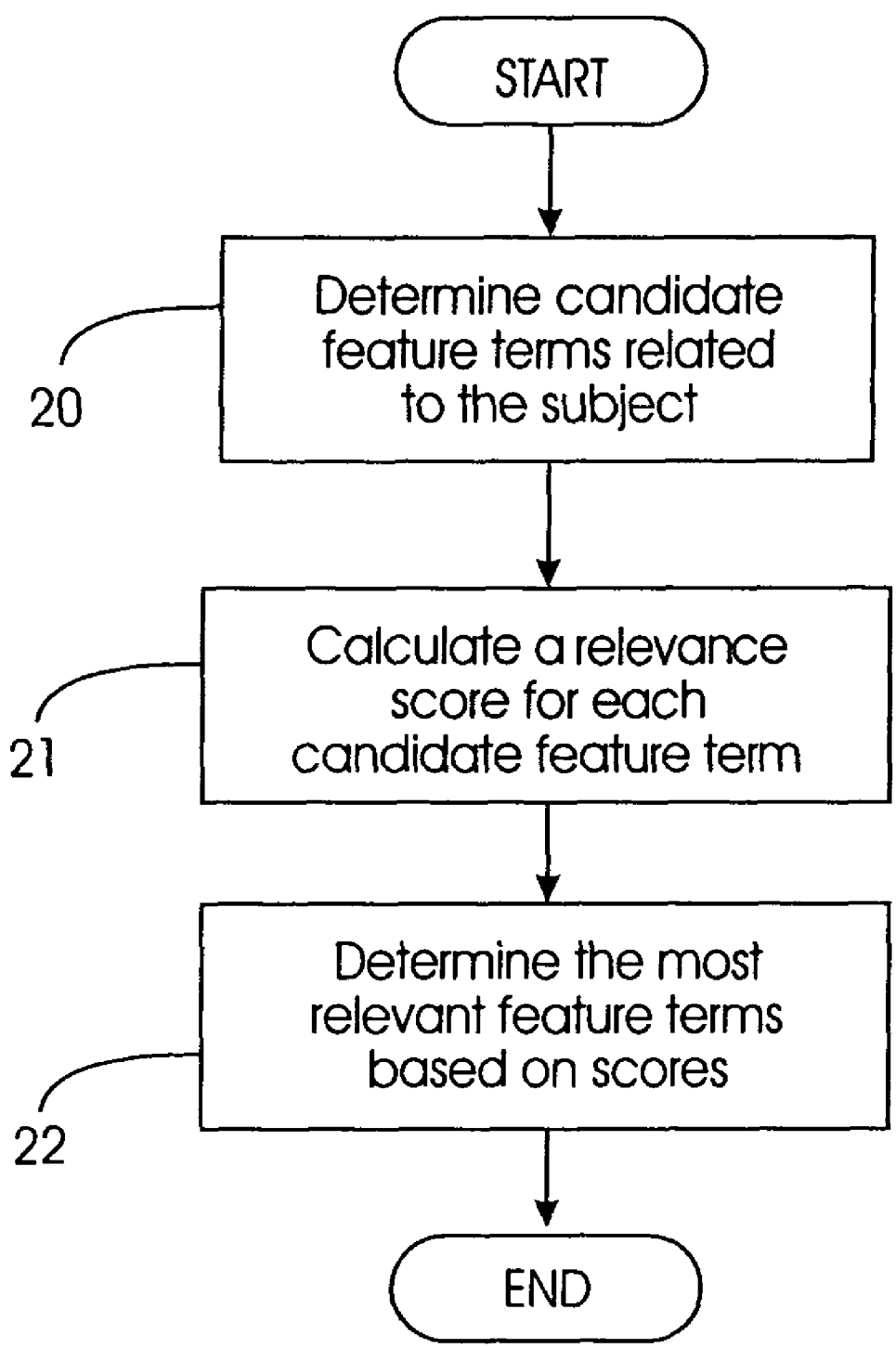
FIG. 2 is a flow chart showing a preferred process for extracting from the document the feature terms that are most relevant to the subject of interest, in accordance with the invention.

A subject feature in this case can be a part of the camera, such as lenses, battery or memory card; an attribute, such as price or size; or an attribute of a feature, such as battery life (an attribute of feature battery). The underlined phrases in the example text are the features that would be extracted in accordance with the invention as described below. For each occurrence of the subject of a subject feature, the method of the invention detects the sentiment specifically about the topic. Based on the observation that the feature terms are nouns, only the noun phrases are extracted from the text. For example, the following output is generated when the subjects of Sony PDA, NR70, and T series CLIEs are specified topics of interest:

1. Sony PDA—positive; NR70—positive
2. T series CLIEs—negative; NR70—positive
3. NR70—positive; NR70—negative Further details on how the relevant feature terms are extracted are now described. FIG. 2 is a flow chart showing a preferred process for extracting from the document the feature terms that are most relevant to the subject of interest. At step 20, the invention determines a set of candidate feature terms associated with the subject. In the preferred embodiments of the invention, candidate feature terms are definite base noun phrases (dBNP) that appear at the beginning of the sentences. Base noun phrases (BNPs) have the following patterns: NN, NN NN, JJ NN, NN NN NN, JJ NN NN, JJ JJ NN, where NN and JJ are the part-of-speech (POS) tags for nouns and adjectives as defined by the University of Pennsylvania's Treebank Project and available at the web site www-.cis.upenn.edu/treebank/. Definite base noun phrases (dBNPs) further restrict candidate feature terms to definite base noun phrases, which are noun phrases preceded by the definite article "the." Given that a document is focused on a certain topic, the definite noun phrases referring to topic features do not need any additional constructs such as attached prepositional phrases or relative clauses, in order for the reader to establish their referent. Thus, the phrase "the battery," instead of "the battery of the digital camera," is sufficient to infer its referent. A beginning definite base noun phrases (bBNP) refers to a dBNP at the beginning of sentences followed by a verb phrase. This heuristic is based on the observation that, when the focus shifts from one feature to another, the new feature is often expressed using a definite noun phrase at the beginning of the next sentence.

In one preferred embodiment of the invention, the feature terms that are most relevant to the subject of interest are identified based on the likelihood-ratio test. The likelihood-ratio test is described, for example, by T. E. Dunning in "Accurate Methods For the Statistics of Surprise and Coincidence," Computational Linguistics, 19(1), 1993. Let $D+$ be a collection of documents focused on a topic T, $D-$ those not focused on T, and bnp a candidate feature term extracted from $D+$. Then, the likelihood ratio is defined as a function of the likelihood of seeing bnp in both $D+$ and $D-$. In another preferred embodiment of the invention, the candidate feature terms are identified based on the mixture language model. For more details on the mixture language model, see, for example, "Model-based Feedback In The Language Modeling Approach To Information Retrieval," C. Zhai et al., Proc. of the 10th Information and Knowledge Management Conf., 2001. Such a model assumes that an observed document d is generated by a mixture of the query model and the corpus language model. In the case of the invention, the language model might be considered as the mixture (or a linear combination) of the general web language model (similar to the corpus language model) and a topic-specific language model (similar to the query model).

At step 21, a relevance score for each candidate feature is calculated. In the case of the likelihood ratio test, the score for each candidate feature term is its likelihood ratio. The computed relevance scores are then sorted. At step 22, the candidate feature terms with highest relevance scores are identified as the most relevant feature terms.

Figure 3:
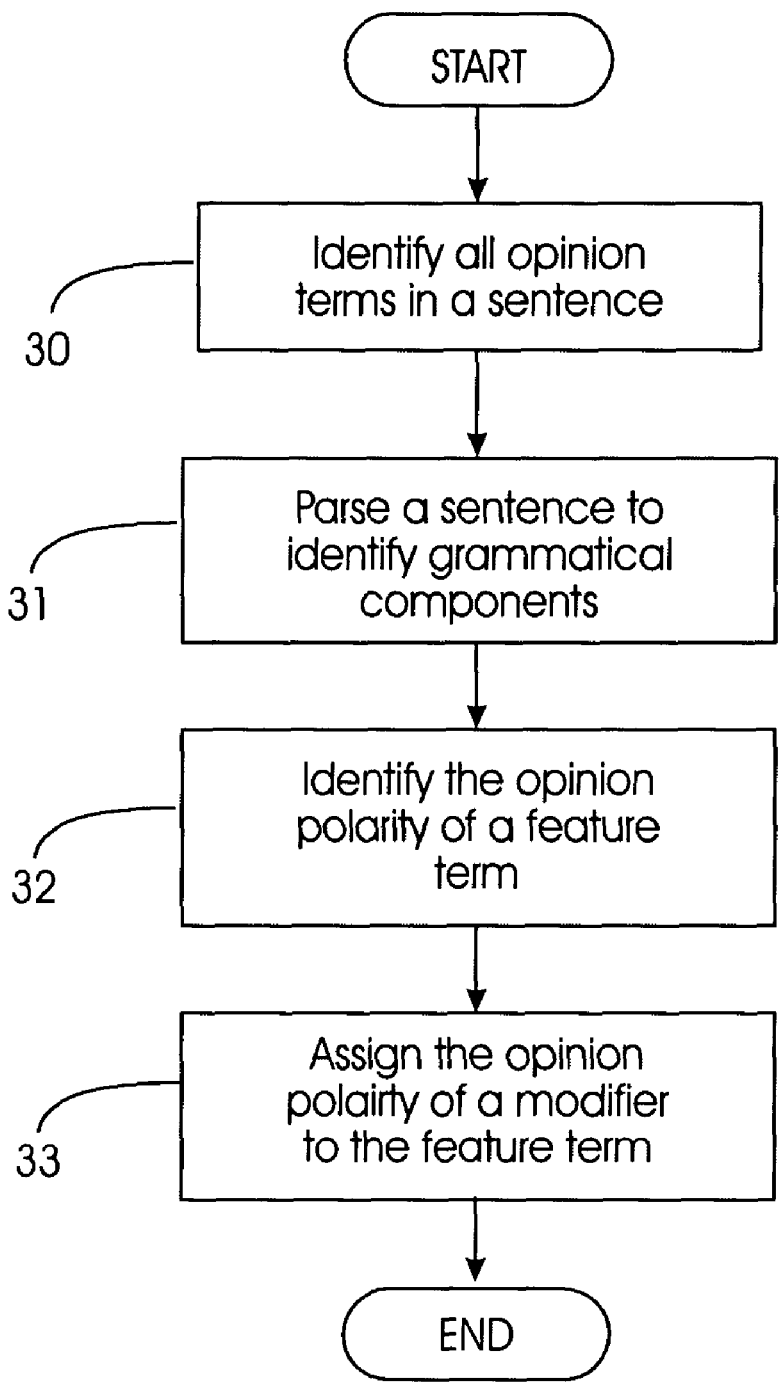
FIG. 3 is a flow chart showing the details of a preferred process for determining whether a sentence includes an opinion polarity in accordance to with the invention.

FIG. 3 is a flow chart showing the process for determining whether a sentence includes an opinion polarity. At step 30, the invention identifies all opinion terms in the sentence using an opinion dictionary, also referred to as a sentiment lexicon. An opinion about a subject is the orientation (or polarity) of the opinion on the subject that deviates from the neutral state. An opinion that expresses a desirable state (e.g., "the picture is flawless") has positive (or "+") polarity, while one representing an undesirable state (e.g., "the product fails to meet our quality expectations") has negative (or "−") polarity. The target of the opinion is the subject that the opinion is directed to: the picture and the product for the examples above. The invention uses the opinion terms defined in the opinion dictionary and the opinion rules (or sentiment patterns) in an opinion rule database to identify opinion terms and their associated polarities. The opinion dictionary contains the definitions of individual opinion-related words in the following form:

<lexical_entry> <POS> <opinion_category>
    lexical_entry is a (possibly multi-word) term that has a sentimental connotation.
    POS is the required POS tag of lexical entry.
    opinion_category: may be positive(+) or negative(−)

Thus, an entry in the opinion dictionary includes an opinion term (e.g., excellent), a part-of-speech tag (e.g., JJ), and an opinion polarity (e.g., positive). An example of the dictionary entry would be "excellent" JJ +. The opinion words may be collected from several sources such as the General Inquirer (GI)1, the Dictionary of Affect of Language (DAL)2[21], and WordNet[11]. The words may be in positive, negative, and hostile categories.

At step 31, for each sentence that includes a feature term and an opinion term, the invention parses the sentence using an English parser to identify the grammatical components of the sentence as well as relationships between these components. The grammatical components of a sentence include verb phrases, subject phrases, object phrases, complements, and prepositional phrases. At step 32, the invention identifies the opinion polarity for the feature term by looking up the opinion dictionary for the opinion term associated with the feature term. Note that a feature term might have a modifier that further qualifies or describes the meaning of the term. At step 33, for each sentence that includes a verb phrase where the verb phrase has no matching entry in the opinion dictionary, the invention assigns the opinion polarity of the modifier of the feature term to the feature term itself. The opinion polarity for the modifier is defined by the opinion dictionary.

In addition to using the opinion dictionary, the opinion polarity of a feature term might be identified based on the contents of an opinion rule database. In a preferred embodiment of the invention, each rule in the opinion rule database includes a relationship term, a target of the opinion, and an opinion polarity. In another preferred embodiment of the invention, each rule in the opinion rule database includes a relationship term, a source of the opinion, and a target of the opinion. The target of the opinion is preferably a grammatical component of the sentence to which the opinion will be assigned. The source of the opinion is a grammatical component of the sentence of which the opinion polarity is to be assigned to the opinion target. For a sentence that includes a verb phrase, the invention finds an entry in the opinion rule database that matches the verb phrase. If there is a matching entry in the rule database, then the invention assigns the opinion polarity of the matching entry to the feature term as defined by the entry. The opinion rule database contains the opinion extraction patterns for the sentence predicates. Thus, an entry in the database might be defined in the following form:

<predicate> <sent_category> <target>
    predicate: typically a verb
    sent_category: +|−| source The source is a sentence component (SP, OP, CP, or PP) whose opinion is transferred to the target. SP, OP, CP, and PP represent a subject phrase, an object phrase, a complement (or an adjective) phrase, and a prepositional phrase, respectively. The opposite opinion polarity of source is assigned to the target, if a negation indicator is specified in front of source. The target is a sentence component (SP, OP, or PP) that the opinion is directed to. Some verbs have a positive opinion or a negative opinion by themselves, but some verbs (referred to as trans verbs), such as "be" or "offer", do not. The opinion of a subject phrase in a sentence with a trans verb is determined by another component of the sentence. Some example opinion patterns and their matching sentences: impress+PP (by; with). For example, "I am impressed by the picture quality".

The opinion verbs might be initially collected from different sources. From some training sets, they might be refined further into opinion rules. The refinements typically involve the specification of opinion source and target. After parsing each input sentence by an English parser, the invention identifies opinion phrases from subject, object, adjective, and prepositional phrases of the sentence. Within each phrase, it identifies all opinion adjectives defined in the opinion dictionary. For example, "vibrant" is positive opinion phrase for the sentence "The colors are vibrant." All base noun phrases that consist of at least one opinion word are also extracted. The opinion of the phrase is determined by the opinion words in the phrase. For example, "excellent pictures (JJ NN)" is a positive opinion phrase because "excellent (JJ)" is a positive opinion word. For an opinion phrase with a word having a negative meaning, such as not, no, never, hardly, seldom, or little, the polarity of the opinion is reversed.

Referring again to FIG. 1, at step 13, an opinion skeleton is generated for each extracted opinion to provide supporting details for the opinion. The opinion skeleton might be a binary expression (a B-expression) or a ternary expression (a T-expression). An example of a binary skeleton is <good quality, photo>. An example of a T-expression is <camera, take, excellent picture>. The T-expressions and B-expressions are associations between the subject and the opinions. From a T-expression, the opinion of the verb (for an opinion verb) or the source (for a trans verb) is assigned to the target. From a B-expression, the opinion of the adjective is also assigned to the target. For each opinion phrase that the invention detects, it determines a target for the opinion and a final polarity based on the opinion rule database. The invention first identifies the T-expressions, and tries to find matching opinion rules in the database. Once a matching opinion rule is found for a T-expression, the target of the opinion and the opinion assignment are determined as defined in the opinion rule. Some opinion rules specify their targets and opinions explicitly. For other rules, they must be analyzed further in order to identify these elements. As an example, consider the sentence "I am impressed by the flash capabilities", the opinion rule "impress"+PP(by;with)", and the subject "flash". The invention identifies the T-expression of the sentence as <flash capability, impress, " ">and directly infers that the target (PP lead by "by" or "with"), the flash capabilities, has a positive opinion polarity (flash capability, +).

For a sentences having with a trans verb, the invention first determines the opinion of the source and assigns the opinion to the target. For example, for the sentence "this camera takes excellent pictures" and the subject term "camera", the invention parses the sentence and identifies the following components:

matching opinion rule: <"take" OP SP>
    subject phrase (SP): this camera
    object phrase (OP) : excellent pictures
    opinion of the OP: positive
    T-expression : <camera, take, excellent picture>

From this information, the invention infers that the opinion of source (OP) is positive, and associates the positive opinion to the target (SP): (camera, +). During the semantic relationship analysis, the invention takes a negation of the opinion polarity into account at the sentence level. If an adverb with a negative meaning (such as not, never, hardly, seldom, or little) appears in a verb phrase, the invention reverses the opinion of the sentence that is assigned by the corresponding opinion rule. For example, the invention would detect a negative polarity in the following sentence: "This camera is not good for novice users."

There are many cases where an opinion rule-based analysis is not possible such as when no corresponding opinion rule is available, the sentence is not complete (i.e., sentence fragments), or the parser fails possibly due to missing punctuation, wrong spelling, etc. Examples of sentence fragments containing opinions are:

"Poor performance in a dark room".
"Many functionalities for the price".

In these cases, the invention generates B-expressions and makes the opinion assignment on the basis of the phrase opinion. The B-expressions and opinion associations of these two sentences would be:

<poor, performance>: (performance, −)
<many, functionality>: (functionality, +)

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method performed on a computer for extracting opinions about a subject of interest from a text document having a plurality of sentences, the subject associated with a plurality of features, the method comprising:
    determining from the document feature terms related to the features most relevant to the subject, comprising:
        determining a definite article is located at the beginning of a sentence in the plurality of sentences; and
        determining the definite article precedes the feature term;
    extracting from the document feature terms related to the features most relevant to the subject;
    for each sentence referring to a feature term, determining whether the sentence includes an opinion polarity about the feature term;
    for each sentence referring to the subject, determining whether the sentence includes an opinion polarity about the subject,
    wherein the determining comprises:
        identifying opinion terms in the sentence using an opinion dictionary, each entry in the dictionary having an opinion term, a part-of-speech tag, and an associated opinion polarity,
        for each sentence having a feature term and an opinion term, parsing the sentence with an English parser to identify grammatical components in the sentence and relationships between said components, and
        identifying an opinion polarity associated with said feature term using the opinion dictionary,
        wherein:
            the grammatical components include verb phrases, subject phrases, object phrases, complements, and prepositional phrases, and
            each feature term may have a modifier describing the feature term, and the identifying includes for each sentence having a verb phrase where the verb phrase has no matching entry in the opinion dictionary, assigning an opinion polarity of the modifier of the feature term to the feature term, the opinion polarity of the modifier being defined in the opinion dictionary; and
    deriving an opinion skeleton for each of the extracted opinion, thereby providing supporting details for this opinion.

2. The method as recited in claim 1, wherein the opinion polarity associated with the feature term is identified based on an opinion rule.

3. The method as recited in claim 2, wherein the rule base comprises a plurality of rules each having a relationship term, a target of the opinion, and a polarity of the opinion.

4. The method as recited in claim 2, wherein the rule base comprises a plurality of rules each having a relationship term, a source of the opinion, and a target of the opinion.

5. The method as recited in claim 4, wherein the target of the opinion is a component of the sentence to which the opinion is to be assigned.

6. The method as recited in claim 4, wherein the source of the opinion is a component of the sentence of which opinion polarity is to be assigned to the target.

* * * * *